(12) United States Patent
Metzner et al.

(10) Patent No.: US 7,888,969 B2
(45) Date of Patent: Feb. 15, 2011

(54) DRIVER CIRCUIT FOR A TWO-WIRE CONDUCTOR AND METHOD FOR GENERATING TWO OUTPUT CURRENTS FOR A TWO-WIRE CONDUCTOR

(75) Inventors: Dieter Metzner, Eichenau (DE); Eric Pihet, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 12/689,790

(22) Filed: Jan. 19, 2010

(65) Prior Publication Data
US 2010/0201399 A1 Aug. 12, 2010

(30) Foreign Application Priority Data
Feb. 6, 2009 (DE) .................... 10 2009 000 697

(51) Int. Cl.
*H03K 19/0175* (2006.01)
(52) U.S. Cl. ............................. 326/86; 326/31; 326/33
(58) Field of Classification Search .................. 326/21, 326/31–33, 86–87; 327/108, 109, 333
See application file for complete search history.

(56) References Cited
U.S. PATENT DOCUMENTS

| | | | |
|---|---|---|---|
| 6,154,061 A | 11/2000 | Boezen et al. | |
| 6,324,044 B1 | 11/2001 | Teggatz et al. | |
| 6,691,056 B2 | 2/2004 | Muth et al. | |
| 6,897,683 B2 * | 5/2005 | Kernahan et al. | 326/86 |
| 6,922,073 B2 * | 7/2005 | Haase et al. | 326/27 |
| 7,113,759 B2 | 9/2006 | Jordanger et al. | |
| 7,432,730 B2 * | 10/2008 | Bucossi et al. | 326/26 |
| 7,536,050 B2 | 5/2009 | Boykov et al. | |
| 2002/0087937 A1 | 7/2002 | Muth et al. | |
| 2004/0008886 A1 | 1/2004 | Boykov | |
| 2004/0043739 A1 | 3/2004 | Jordanger et al. | |
| 2004/0124905 A1 | 7/2004 | Haase et al. | |
| 2007/0292025 A1 | 12/2007 | Boykov et al. | |

FOREIGN PATENT DOCUMENTS

| | | |
|---|---|---|
| DE | 100 59 769 A1 | 6/2002 |
| DE | 102 50 576 B4 | 4/2005 |
| DE | 10 2004 056 305 A1 | 7/2005 |

* cited by examiner

*Primary Examiner*—James Cho
(74) *Attorney, Agent, or Firm*—Slater & Matsil, L.L.P.

(57) ABSTRACT

A driver circuit and method for generating two complementary output currents from a two-state logic input signal at two outputs for connecting a two-wire conductor provide the following actions: generating from the input signal, an output signal at each output, the amperage of one of the output currents being adjustable by a control signal; analyzing each voltage materializing at the outputs; generating an error signal as a function of the output voltages within each of at least two time slots subsequent to a change in state of the input signal; caching the error signals or signals derived therefrom and adjusting, as a function of cached error signals or of the cached signals as a function thereof, the output current in corresponding time slots subsequent to a resulting change in state of the input signal.

25 Claims, 9 Drawing Sheets

FIG 2
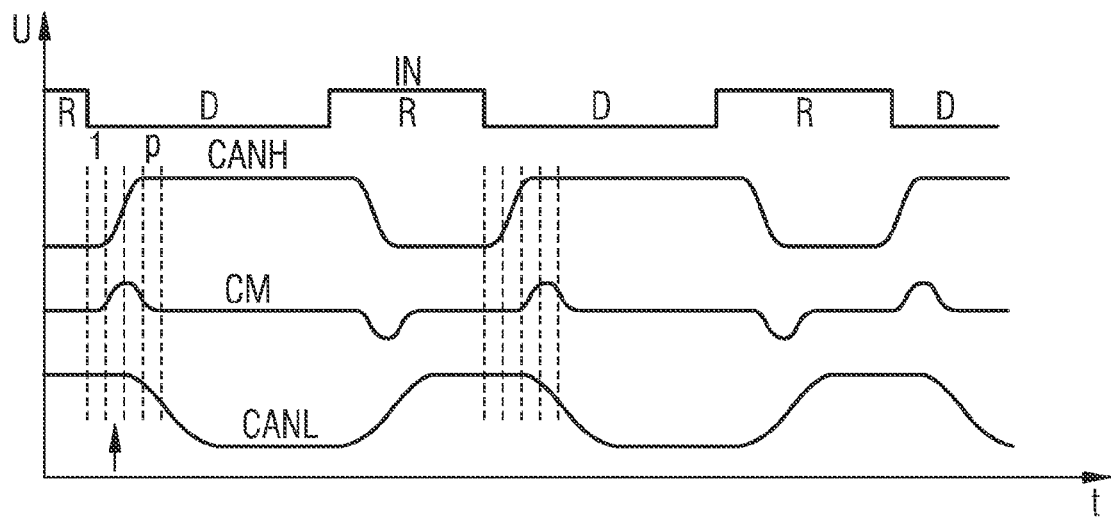
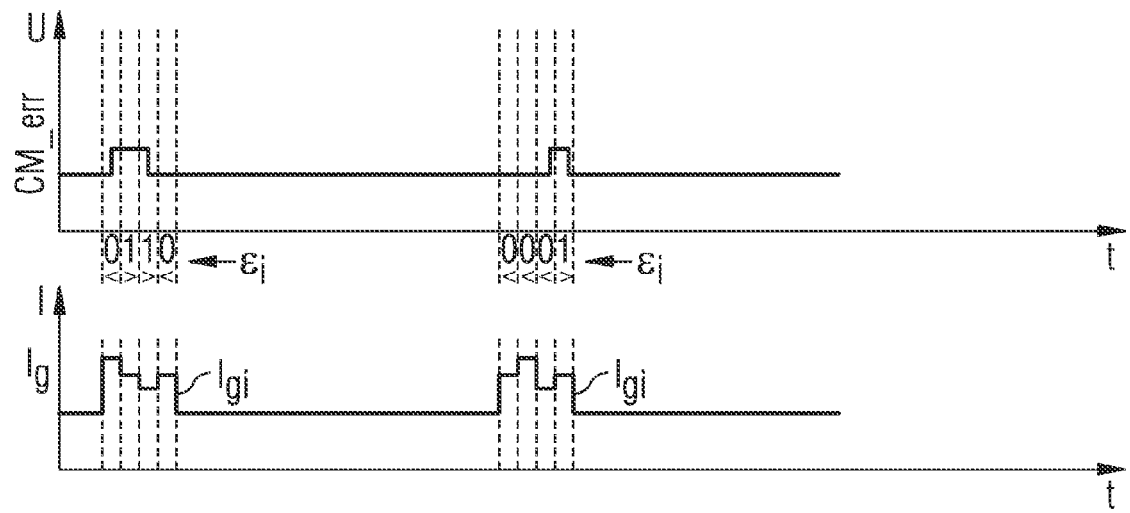

DRIVER CIRCUIT FOR A TWO-WIRE CONDUCTOR AND METHOD FOR GENERATING TWO OUTPUT CURRENTS FOR A TWO-WIRE CONDUCTOR

This application claims priority to German Patent Application 10 2009 000 697.4, which was filed Feb. 6, 2009 and is incorporated herein by reference.

TECHNICAL FIELD

The invention relates to a driver circuit for a two-wire conductor for generating two complementary output currents from a two-state logic input signal and to a method for generating two complementary output currents at two outputs for a two-wire conductor from a two-state logic input signal.

BACKGROUND

Two-wire conductors operated with complementary currents find an application particularly in bus systems designed for optional extension and/or lengthy conductors as is the case, for example, in a universal serial bus (USB) or in a controller area network bus (CAN bus). The signals to be communicated are fed into the two-wire conductor by means of a special driver circuit necessitating compliance especially with regards to electrostatic discharge (ESD), electromagnetic interference (EMI), electromagnetic compatibility (EMC) and signal integrity requirements. In particular with regards to EMI, the common mode response should be a salient factor. Although passive common mode chokes are often employed for a good common mode response, they are at a great disadvantage as to the required space, weight and costs involved. Despite active circuit assemblies also being known to improve the common mode response of driver circuits they are hampered by being unstable in not always achieving a satisfactory common mode response. There is thus a need to further improve known driver circuits by means of active circuiting techniques.

SUMMARY OF THE INVENTION

A driver circuit for a two-wire conductor generates two complementary output currents from a two-state logic input signal that includes two output stages, each of which generates at an output one of the two output currents from the input signal and one of which is adjustable as to the amperage of the output current. Coupled to the two output stages is a controller for analyzing the voltages output by the two output stages in generating an error signal derived therefrom within each of at least two time slots subsequent to a change in state of the input signal, caching the error signals or signals derived therefrom and adjusting, as a function of cached error signals or of cached signals derived therefrom, the output current of the one output stage in arbitrary time slots subsequent to a proximate change in a state of the input signal.

The method for generating two complementary output currents from a two-state logic input signal at two outputs includes the steps: generating from the input signal an output signal at each output, the amperage of one of the output currents being adjustable by a control signal; analyzing each voltage materializing at the outputs; generating an error signal as a function of the output voltages within each of at least two time slots subsequent to a change in state of the input signal; caching the error signals or signals derived therefrom and adjusting, as a function of cached error signals or of the cached signals as a function thereof, the output current of the one output stage in corresponding time slots subsequent to a resulting change in state of the input signal.

BRIEF DESCRIPTION OF THE DRAWINGS

The invention can be better understood with reference to the following drawings and description. The components in the figures are not necessarily to scale, instead emphasis being placed upon illustrating the principles of the invention. Moreover, in the figures, like reference numerals designate corresponding parts. In the drawings:

FIG. 2 is a plot showing the voltage and current profiles of various signals in the circuit assembly as shown in FIG. 1 with no analysis of the difference in the output currents;

DETAILED DESCRIPTION OF ILLUSTRATIVE EMBODIMENTS

Figure 1:
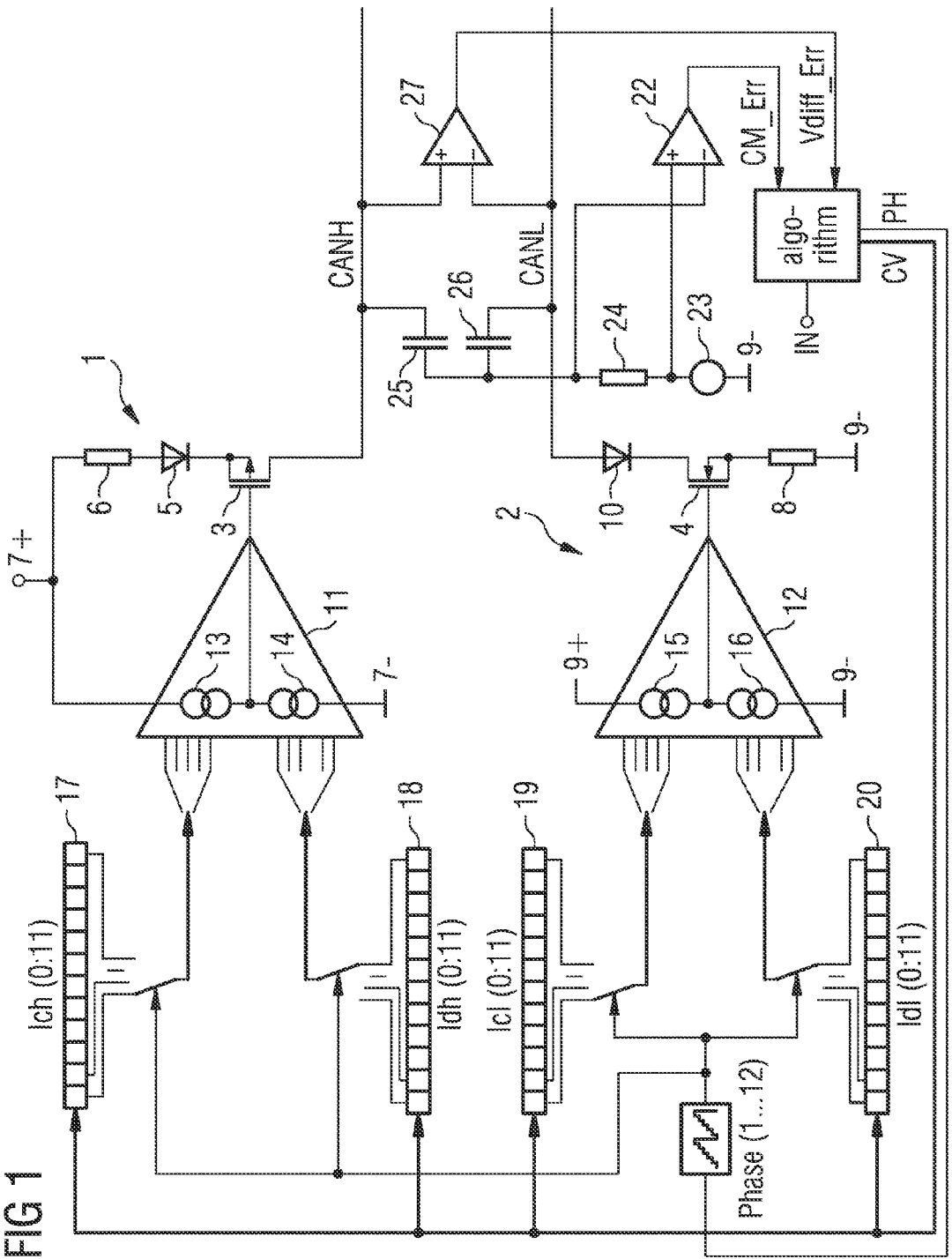
FIG. 1 is a circuit diagram of a novel circuit assembly for activating a two-wire conductor with two complementary output currents as a function of an input signal.

FIG. 1 illustrates a circuit diagram of a novel circuit assembly for activating a two-wire conductor with two complementary output currents CANH and CANL as a function of an input signal IN. The circuit assembly comprises two output stages 1, 2, output stage 1 furnishing the output signal CANH and the other output stage 2 the output signal CANL, each of which is connected to a positive supply potential 7+ and 9+ respectively as well as GND 7− and 9− respectively. Each of the two output stages 1 and 2 includes a (metal) field-effect transistor 3 and 4 respectively, the transistor 3 being a p-channel type and transistor 4 an n-channel type. Instead of field-effect transistors it is possible that bipolar transistors can be used. The source of the transistor 3 is connected via a diode 5 in the FWD direction and in series therewith a resistor 6 is connected to a positive supply potential 7+. The drain of the transistor 3 furnishes the output signal CANH. The source of transistor 4 is connected via a resistor 8 to GND 9− and furnishes the output signal CANL in the FWD direction via a diode 10.

The gates of the transistors 3 and 4 are each activated by a controller 11 and 12 respectively corresponding in their function to two gated current sources 13 and 14 (for transistor 3) respectively 15 and 16 (for transistor 4). In this arrangement one of the current sources namely current sources 13, 15 lead from the corresponding gate of the transistor 3, 4 for example, to the positive supply potential 7+, 9+ whilst the other 14, 16 leads, for example, to GND 7−, 9− respectively.

In this arrangement the current sources 13 to 16 are each digitally controllable by a digital data word applied to them dictating the current output thereby. The data words for controlling the current sources 13 to 16 are saved in cache blocks 17 to 20 from each of which they are read out in synchronism in sequence with control of a signal PH and applied to the corresponding current sources 13 to 16. In the example as shown, every block has twelve data words each 5 bits long. The current sources 13 to 16 in this arrangement may be configured as more complicated digital-to-analog converters with a current output or with a smaller bit length as a plurality of separate switchable partial current sources. Instead of being binary coded the latter may feature data words coded more favorably by the thermometer code.

When and which of the cache spaces of the individual cache blocks 17 to 20 is to be read out is dictated by a controller 21, the data words in the individual cache spaces of the cache blocks 17 to 20 materializing from a control vector (CV). The control signal PH indicates the corresponding cache space of the individual data words for controlling the current sources 13 to 16, the controller 21 itself receiving an input signal IN, an error signal CM_Err and an error signal Vdiff_Err. The error signal CM_Err is made available by a differential amplifier 22, to the non-inverting input of which a reference voltage is applied referred to GND 9− as made available by a reference voltage source 23. The non-inverting input of the differential amplifier 22 is additionally connected via a resistor 24 to a node of two capacitors 25 and 26 at which a common mode voltage CM can be picked off. In this arrangement the one capacitor 25 receives the output signal CANH and the other capacitor 26 receives the output signal CANL. Connected furthermore to the node of the two capacitors 25 and 26 is the inverting input of the differential amplifier 22, resulting in the differential amplifier 22 monitoring the AC common mode response of the two output signals CANH and CANL by generating the error signal CM_Err when deviations exist. Instead of a capacitive voltage divider applicable only for AC voltages an ohmic voltage divider including resistances may be provided, for example, which can then also be put to use for DC voltages.

The error signal Vdiff_Err is made available by a differential amplifier 27 which analyzes the difference of the two output signals CANH and CANL by applying these two output signals to the inverting and non-inverting input of the differential amplifier 22. The circuit assembly as shown in FIG. 1 now makes it possible, in particular, to adapt the edges of both output signals CANH and CANL each relative to the other whilst also (as detailed further on) individually shaping the edges in general in thus also adjusting, in particular, the delay and switching response (slope) individually. For one thing, this assures interrelated symmetry over the full range of operation under all operating conditions and network topologies and, for another, the signal integrity can now be assured particularly without infringing the requirements as to the loop delay. In addition to this, EMI interference is now significantly reduced whilst assuring stable operation of the assembly since the shaping the edge is adapted over a plurality of edges. Adapting the output currents furnished by the transistors 3 and 4 (termed charging and discharging currents respectively hereinafter) is controlled by the two error signals CM_Err and Vdiff_Err. The error signal CM_Err in this arrangement is based on a comparison of a common-mode signal whose value equals output signals CANH+CANL/2 is compared to the ideal voltage, namely the half-value of supply voltage V/2. The error signal Vdiff_Err is based on the differential voltage of the two output signals CANH and CANL is thus equaling output signals CANH−CANL. The two error signals CM_Err and Vdiff_Err are analyzed together with the input signal IN in the controller 21 by means of a special algorithm and the control vector and phase generated as a function thereof. Although the algorithm has a wealth of different configuration possibilities, it is based substantially on the logic as explained in the following.

It is understood that although in the above example two complementary output stages are used, two identical output stages can be employed just as well, then, however, not the symmetry of the output signals but their equivalence (as e.g. in repeater applications in which a binary signal is copied) is monitored, it likewise being understood that instead of a specific output or driver stages as shown, any other type of output or driver stages can be used.

Referring now to FIG. 2 there is illustrated the input signal IN, the output signals CANH and CANL, the common mode signal CM, the common mode error signal CM_Err as well as the gating current Ig delivered to the gate contact of the transistor 3 (respectively 4) each interrelated in time as the voltage plot U respectively as the current plot I as a function of the time t, where i stands for one of p time slots and $\epsilon i$ represents the state of the error signal CM_Err in the time slot i as regards the trailing edge of the input signal IN (for example, the transition from a recessive state R into a dominant state D on a CAN bus). As soon as an edge of the input signal IN occurs, no matter whether leading or trailing, corresponding edges of the output signals CANH and CANL are triggered in each case which, however, include a lesser slope than that of the input signal IN.

The two output signals CANH and CANL are voltagewise complementary, i.e., when the one signal has attained its maximum the other is substantially at its minimum and when the one signal has a leading edge, the other has a trailing edge at that point in time, and vice-versa. As soon as an edge occurs in the input signal the subsequent edges of the output signals CANH and CANL are subdivided into at least two time slots each partly covering the edge, precisely the edge or somewhat more than the edge as is the case as shown here. Although it would be just as possible to totally subdivide the signals into single time slots over the full duration of the input signal IN an analysis roughly in the region of the edges is sufficient to substantially attain adaptation. The time duration of the time slots may be constant, i.e., every time slot having the same duration, or the duration of the time slots is a function of the change in amplitude attained by each edge, i.e., a time slot ending when a certain change in amplitude has occurred. However, for a better illustration it is assumed in the present case that the time slots have a constant duration.

These different edge profiles of the output signals CANH and CANL result in a common mode CM equaling half the supply voltage V/2 when these two output signals are symmetrical whereas deviations result in a corresponding value different to that of supply voltage V/2. In the assembly as shown in FIG. 1 the common-mode signal is established by means of the differential amplifier 22 in conjunction with the reference voltage source 23 and resistor 24 and the two capacitors 25 and 26. In the present case the differential amplifier 22 has a very high gain and thus acts as a comparator so that the error signal CM_Err it makes available is a binary signal. A corresponding control algorithm then furnishes data words from which by means of the controllers 11 and 12 corresponding currents for activating the two transistors 3 and 4 are generated. An example of the gating current Ig generated by way of the error signal CM_Err is likewise evident from FIG. 2. This is not applied to the transistor 3 (or 4) immediately, i.e., at the point in time of the fresh edge, however, but is cached and applied to one of the next edges, in this case the subsequent likewise trailing edge.

However, it is irrelevant for the functioning of the present circuit assembly whether the error signal(s) is/are cached on one edge and the control vector calculated from one of the next edges for immediate application or whether the control vector is calculated from the error signal(s) already on the first edge and cached until applied at one of the next edges. Just as possible, however, are solutions between these two extremes in which the error signal(s) is/are cached on a first edge, the control vector calculated on a second edge from the cached error signals and saved until application on a third edge.

Figure 3:
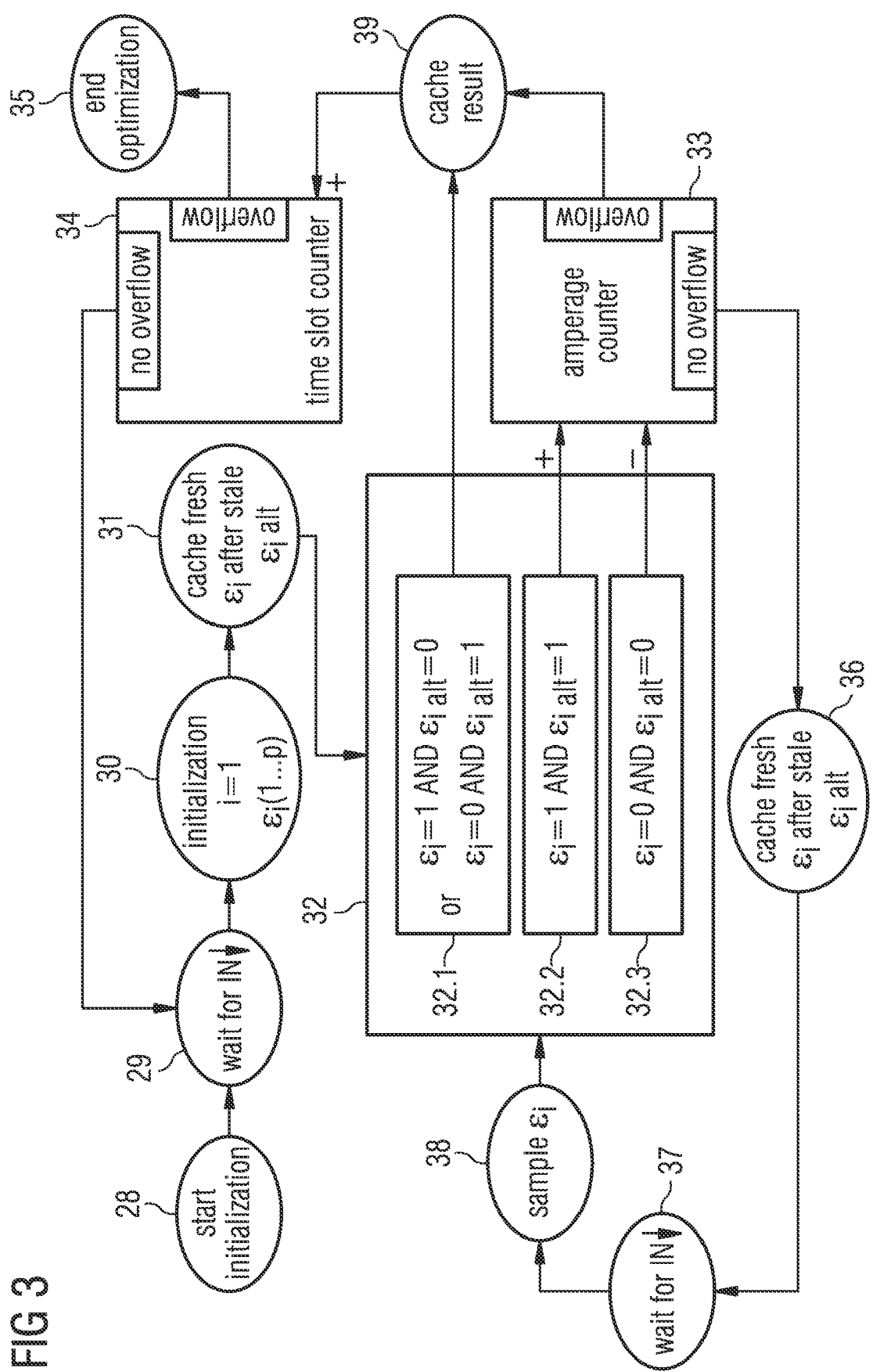
FIG. 3 is a plot showing the sequence of events in the controller of the circuit assembly as shown in FIG. 1 with no analysis of the difference in the output currents.

Referring now to FIG. 3 there is illustrated an example of how the process is sequenced in the controller 21. After start of the optimization process (processing block 28) the edges occurring in the input signal IN are detected (processing block 29), a distinction being made separately in the present assembly between leading and trailing edges and adapted. This is followed by initialization in which starting values $\epsilon i$ of the error signal CM_Err are obtained in time slot i (processing block 30) and cached in updating stale values (processing block 31), i indicating the time slot as optimized and p the number of time slots per edge. After this, numerous comparisons are made in processing blocks 32 (32.1, 32.2 and 32.3). In processing block 32.1 a test is made as to whether $\epsilon i=1$ and $\epsilon i$ alt=0 or whether $\epsilon i=0$ and $\epsilon i$ alt=1, in other words as to whether the error signal has changed as compared to the previous step in optimization. In processing block 32.2 a test is made as to whether $\epsilon i=1$ and $\epsilon i$ alt=1 before, in conclusion, a test is made as to whether $\epsilon i=0$ and $\epsilon i$ alt=0 in processing block 32.3.

The results of processing blocks 32.1, 32.2 and 32.3 are used to control the processing blocks 33 and 34. Processing block 33 has substantially the function of an up/down counter, the count of which represents the gating current Ig (driver amperage). Processing block 32.2 controls processing block 33 such that when the condition (+) is satisfied the counter is incremented, the count corresponding to the driver amperage of a time slot i to be optimized. In processing block 32.3 the situation is the opposite, such that when the condition as per processing block 32.3 fails to be satisfied (−) the counter formed by processing block 33 is decremented. In processing block 33 a test is made as to whether the time slot i is in the overflow condition or not. When an overflow exists the reset input RES is cached in a processing block 39 and processing block 34 then correspondingly incremented (respectively decremented in a down counter), meaning optimization is continued in the next time slot. In addition to this the processing block 34 can also be incremented by processing block 32.1, meaning, in this case, that there has been a change in the error signal and that optimizing the fresh time slot i can be terminated.

The processing block 34 substantially functions as an up-only counter (alternatively as a down-only counter) in which the count corresponds to the time slot to be optimized. On an overflow in processing block 34 a signal is output signalizing end of optimization (35) meaning that all time slots 1 to p have been cycled. When the overflow is a no-show the process skips to processing block 29.

Optimizing the driver current in the fresh time slot i is also continued, for example, (no overflow) when processing block 33 "sees" no overflow, resulting in the stale $\epsilon i$ being updated by the fresh $\epsilon i$ in processing block 36 and thus cached for the further process. After this, in processing block 37 having substantially the same function as processing block 29, there is a wait for the next trailing edge of the input signal IN which, when it occurs, prompts a new fresh value $\epsilon i$ being 38 established and passed on to processing block 32 for further processing and which, as explained above, implements the various comparisons in the 32.1, 32.2 and 32.3. This loop involving sampling a value $\epsilon i$ each time is cycled until an overflow is indicated in processing block 33.

The blocks 32.1, 32.2, 33, 36, 37, 38 form an inner loop (current counter loop) which is exited when there is a change in the error signal and when the counter (block 33) "sees" an overflow. The rest can be viewed as an outer loop (time slot loop 1 to p).

Figure 4:
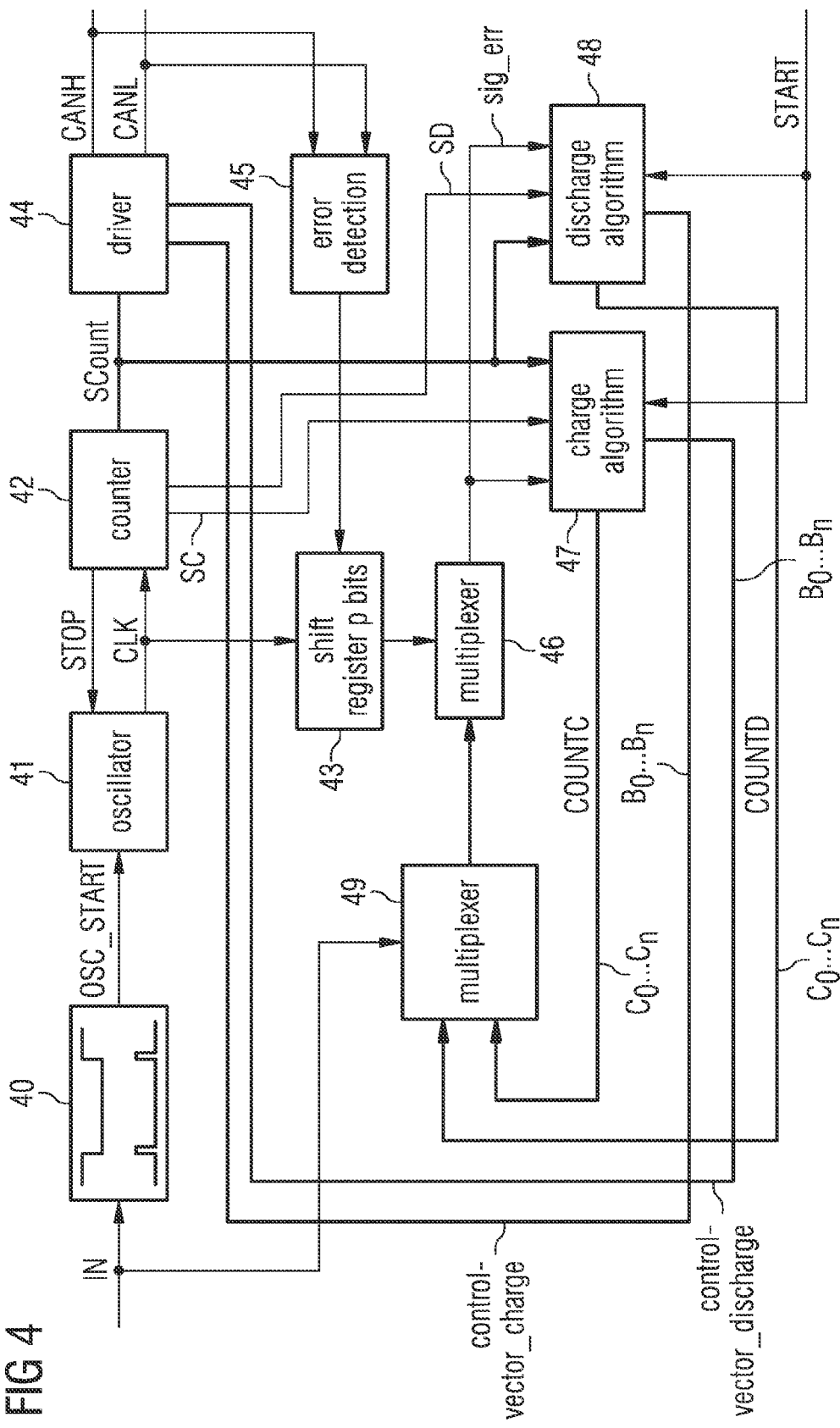
FIG. 4 is a signal flow diagram of one example of how the method as shown in FIG. 3 is implemented.
Figure 6:
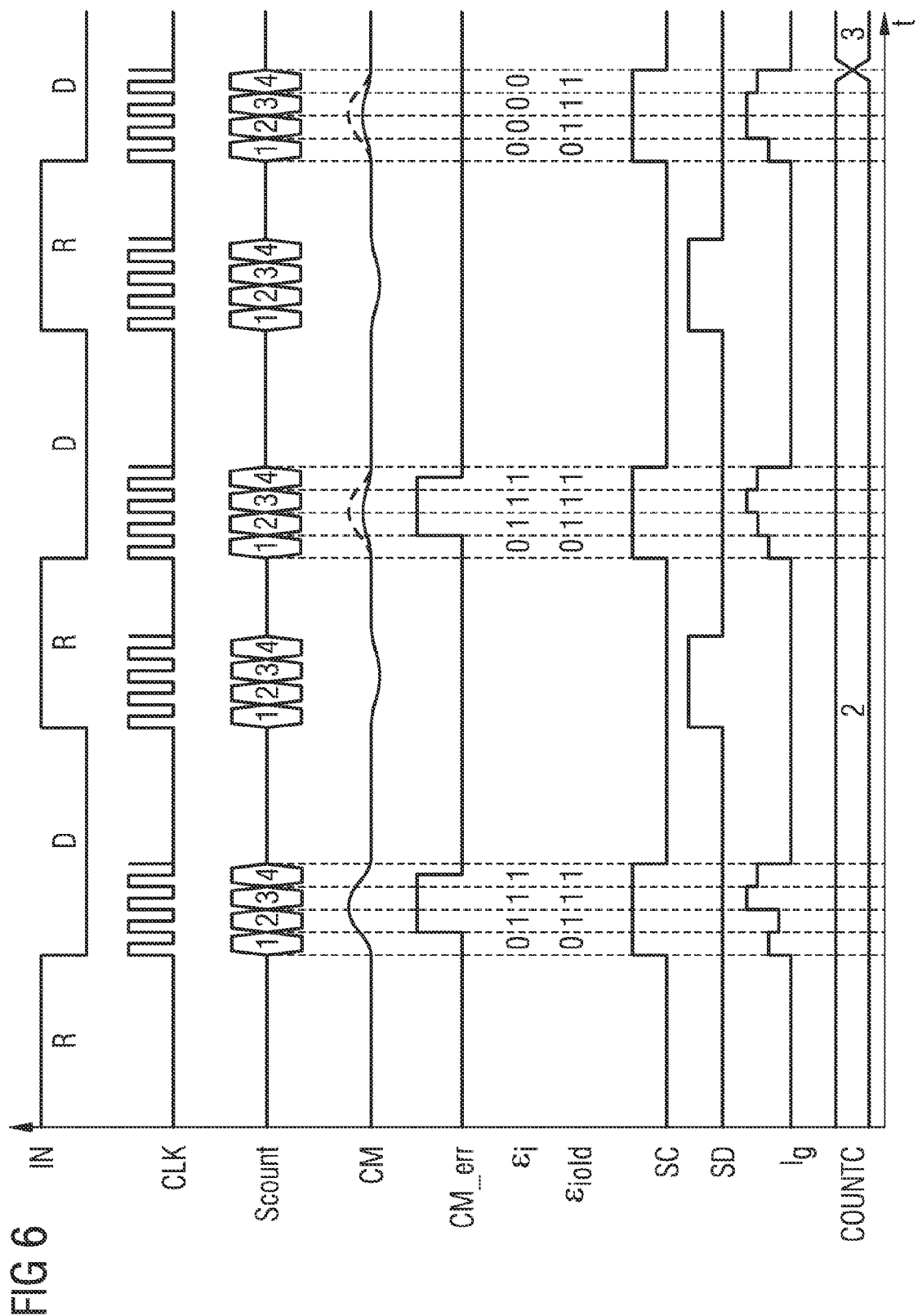
FIG. 6 is a plot showing the signal profiles of a method as shown in FIGS. 3 to 5.

Referring now to FIG. 4 there is illustrated an example of how the process as described above is implemented by delivering the input signal IN to an edge detector 40 and a multiplexer 49. The detector 40 detects a change of state (edge) in the input signal IN from recessive to dominant and vice-versa, outputting for this purpose a signal OSC_START irrelevant of whether the edge is trailing or leading. The occurrence of an edge thus activates an oscillator 41 by the signal OSC_START. The output signal of the oscillator 41 is delivered to both a counter 42, which in this case is 4-bit wide, and to a shift register 43 which is 16-bit wide. The output signal of the oscillator 41 increments the counter 42, for example, and shifts the shift register 43 further to the right. The output of the counter 42 activates output stages 44 (driver) which furnish the output signals CANH and CANL at their outputs. Edge detector 40, oscillator 41 and counter 42 serve to define the time slot i after a change of state of the input signal IN, furnishing together the signals CLK (clock), SD (discharge signal), SC (charge signal) and a p-bit wide count SCOUNT (e.g., 2-bit wide in the assembly as shown in FIG. 6). The count SCOUNT is used in the output stages 44 to set the output amperage in the time slot i.

The output signals CANH and CANL are then analyzed in an error detection unit 45 as a function of which at least one error signal, for instance an error signal CM_err is generated which in the simplest case includes just one single bit, thus simply indicating whether an error has occurred or not. This single bit, for example, is entered into the shift register 43 and shifted as clocked by the oscillator 41 (for example, to the right). The p-bit wide value formed in the shift register 43 thus represents a time sequence of the $\epsilon i$ values. By a multiplexer 46 controlled by a multiplexer 49, 1 bit (and thus a specific $\epsilon i$) is selected in each case and delivered to a charge current controller 47 or discharge current controller 48. In this arrangement the multiplexer 49 defines the place of the corresponding value $\epsilon i$ in the shift register 43 for the charge current controller 47 or discharge current controller 48 in each case as a function of a word COUNTC or COUNTD furnished by the charge current controller 47 and discharge current controller 48, the $\epsilon i$ then being selected by the multiplexer 46 and forwarded to the controllers 47 and 48 as a 1-bit signal sig_err. Thus, when, for instance, a time slot i is just to be optimized for an edge from recessive to dominant (corresponding to a charging algorithm) then the multiplexer 49 selects the associated COUNTC signal identifying the time slot to be processed and the multiplexer 46 selects the corresponding error signal in this time slot i. In addition to this, the two controllers 47 and 48 receive from the counter 42 the signals SC and SD respectively defining a time window on a trailing or leading edge of the input signal IN (see FIG. 6) as well as a START signal in generating therefrom the control vectors control_vector_charge and control_vector_discharge respectively which are delivered to the output stages 44 (driver) in controlling the amperage of output currents CANH and CANL.

Figure 5:
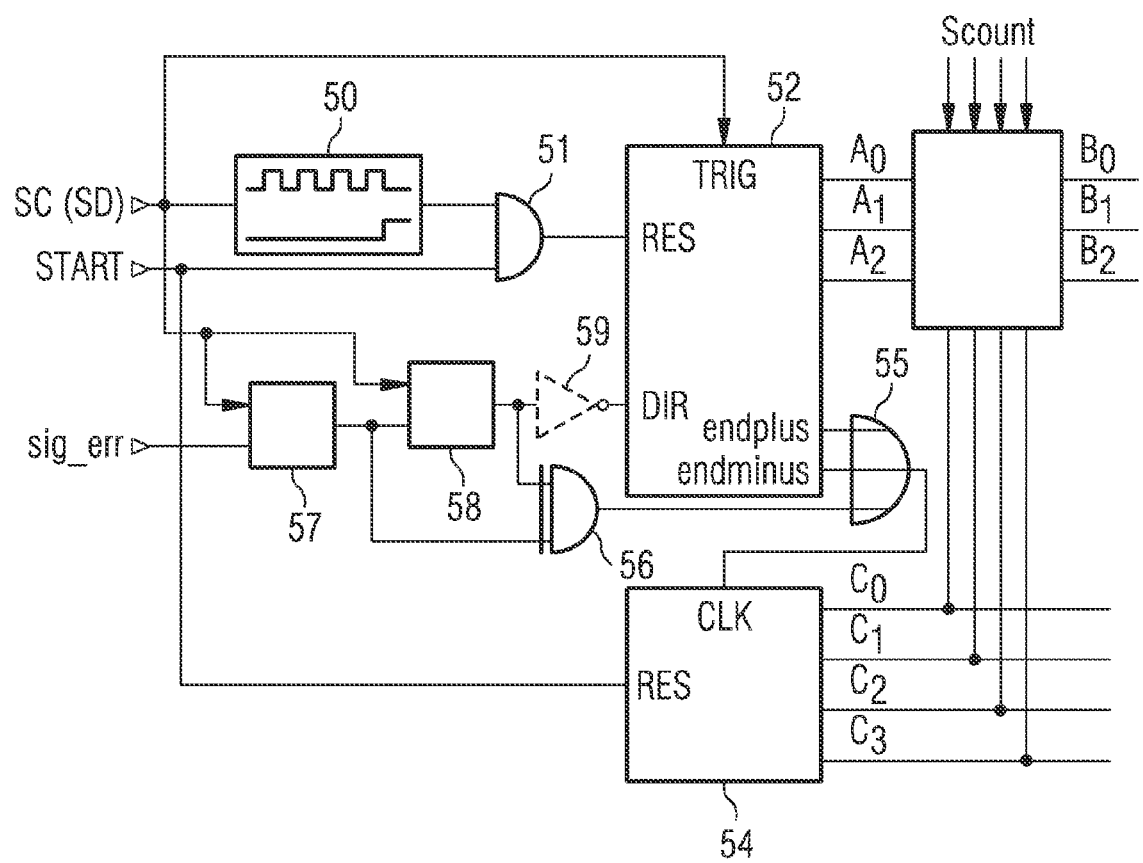
FIG. 5 is a block circuit diagram of one example of how charging current control blocks as implemented in FIG. 4 are implemented.

Referring now to FIG. 5 there is illustrated how the charge current controller 47 and discharge current controller 48 as shown in FIG. 4 are configured, differing solely by an opposite counting direction (for example, of the counter 52 as shown in FIG. 5). By means of the control signal SC or SD as a function of whether the edge is leading or trailing an edge counter 50 is activated, the output signal of which is applied via an AND gate 51 to the reset input RES of an up/down counter 52. The time up to the fourth trailing edge serves as the time for initializing the cache elements 57 and 58, representing the fresh $\epsilon i$ and the stale $\epsilon i$ (old). Applied in addition to the AND gate 51 is the START signal. The counter 52 is, for example, a three-bit counter whose three bit lines A0, A1, A2 are circuited to a cache 53 whilst the bit lines A0, A1, A2 of the counter 52 are circuited with the corresponding data inputs of the cache 53 which furnishes data at its outputs B0, B1, B2, the addresses of which are made available via bit lines C0, C1, C2, C3 by a 4-bit wide up (alternatively down) counter 54. The cache also receives the count Scount of the counter 42 as shown in FIG. 4, the counting direction of the counter 52 indicating whether the charging or discharging action is involved.

The counter 54 is clocked by the output signal of an OR gate 55 and can be reset to its reset input RES by the START signal. The OR gate 55 has three inputs, one of which is formed by an end-minus signal and an end-plus signal of the counter 52 as well as by the output signal of an exclusive OR gate 56. The signals end-minus and end-plus signal overflow of the counter in the negative or positive direction, meaning that the counter is initialized, for example, at a count corresponding to the value 0 and can then assume the values −3, −2, −1 in the negative direction or +1, +2, +3, +4 in the positive direction. The signals end-minus and end-plus thus indicate when the counter has attained the values −3 and +4 respectively. The counter 52 is clocked by a signal applied to a trigger input TRIG and can be reset by the reset signal to a specific value (for example, 2) and initialized by the signal SC respectively SD at the trigger input TRIG. Here, the signals end-minus and end-plus indicate the overflow of the counter in the negative or positive direction. The exclusive OR gate 56 has two inputs, one of which is connected to the output of the cache element 57 and the other to the output of a cache element 58 downstream of the cache element 57, the input of the cache element 57 being activated by a sig_err signal. Data acceptance of the two cache elements 57 and 58 is controlled by the signal SC respectively SD.

The charge current controller 47 (respectively discharge current controller 48) as shown in FIG. 5 works as follows: after optimization has been started by means of the START (e.g., START=1) initialization of the signal sig_err occurs firstly over four trailing edges of the signal SC(SD), the up/down counter 52 not being released until after initialization. The cache element 57 receives the fresh value $\epsilon i$ and cache element 58 a previous "stale" value $\epsilon i$ (one or more edges previously). These two values are compared by means of the exclusive OR gate 56. If the values differ, the output of the exclusive OR gate 56 is set to 1. The stale $\epsilon i$ determines the direction of the counter 52 by means of a DIR signal for the counter 52 for the charge current controller 47, an inverter 59 being correspondingly circuited upstream of the input DIR as regards the discharge current controller 48.

If the value is 1, an attempt is made to change the amperage in section i so that the value equals 0, the counter being incremented or decremented on a trailing edge of the signal SC (respectively SD). The counter 52 can overflow in the plus or minus direction as is signaled by the signals endplus and endminus, optimization of the time slot being terminated on an overflow (endplus, endminus) or on a change of the error signal at the exclusive OR gate 56. The output of the OR gate 55 is thus set to 1 and the counter 54 (the count corresponding to the time slot i being optimized at the time) incremented. The count for every time slot is cached in the cache 53. The signal Scount serves to select the right control vector belonging to the time slot i when the edge is cycled.

The counter 52 in this arrangement is a three-bit up/down counter set, to start with, to the value 2, for example. By means of the error detection unit 45 as shown in FIG. 4 the error signal associated with the output signals CANH and CANL is computed. Assuming in the present case that this is for a certain time slot, for example, the second time slot after occurrence of the edge, there already exists for this time slot a stale value as computed from the last cycle and cached in the cache element 58. Thus, when the error signal furnished by the error detection unit 45 indicates an error, the counter 52 is decremented by 1 and in case no error is indicated, the counter 52 is incremented by 1. If the error signal, as compared to the cached stale error signal, has changed, adjusting the output currents is interrupted. When the counter 52 signalizes an overflow in the positive or negative direction the counter 54 is incremented by 1. Thus, the counter 52 in the circuit as shown in FIG. 5 serves the purpose of discretizing the amplitude of the phase concerned whilst the counter 54 selects or identifies the corresponding time slot i.

Referring now to FIG. 6 there is illustrated, among other things, the plots of the signals Scount, SC, SD, CANH, CANL and sig_err, taking into consideration only four time slots (p=4), it being evident how optimization has already commenced on the first trailing edge of the input signal IN and is in time slot (COUNTC=) 2. On the second trailing edge of the input signal IN the current in the time slot 2 is increased. But since there is no change in the error signal in time slot 2 the current is further increased on the third trailing edge of the input signal IN, resulting in a change in the error signal CM in time slot 2 causing a change of the COUNTC signal where the next time slot is optimized. On, for example, a trailing edge of the input signal IN the signal Scount commences clocking for a period of time as predefined by the signal SC after occurrence of the corresponding edge. In this arrangement the signal SC is designed such that it commences on the corresponding edge of the input signal IN but not extended until occurrence of the next edge safely outlasting the edges of the output signals CANH and CANL. The signal SD is the signal complementary to SC, applying the signal Scount for a certain time after occurrence of the leading edge. The error signal CM materializing from the output signals CANH and CANL representing, for example, the common mode error then results in a 1-bit error signal CM_Err with a duration of more than two time slots.

Figure 7:
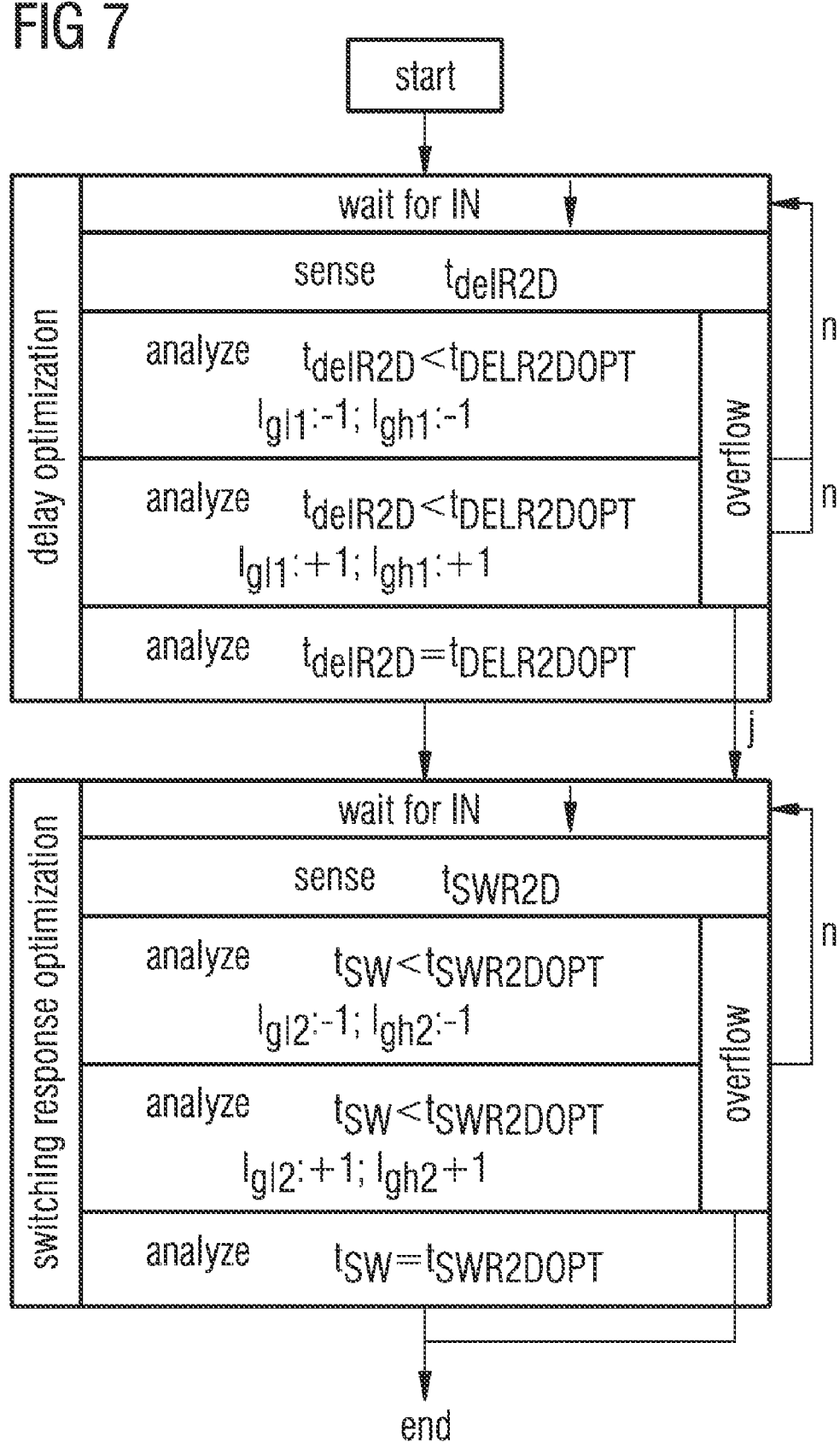
FIG. 7 is a plot showing the sequence of events in a method as an alternative to that as shown in FIG. 3 with delay and switching response of the output signal optimized.

Referring now to FIG. 7 there is illustrated in a state diagram a process in which, for one thing, the delay (block "delay optimization") and, for another, the switching response (block "switching response optimization") of the output signals CANH, CANL is optimized as compared to the corresponding edge of the input signal IN.

Firstly, after start, the block "delay optimization" waits for the corresponding edge of the input signal IN, after which a time interval tdel1R2D representing the delay is sensed which in a subsequent two-stage analysis is firstly compared to time interval TdelR2DOPT representing the optimum, as a result of which the gate current Igl1 is set for the transistor 4 respectively Igh1 for transistor 3. When the time interval tdelR2D is smaller as compared to the time interval TdelR2DOPT then the count representing the gate currents Igl1 and Igh1 of the two output transistors 3, 4 is decremented by 1, followed by a comparison of the time interval tdelR2D and the time interval TdelR2DOPT as to whether the sensed value tdelR2D is greater than TdelR2DOPT.

If it is, the count representing the gate currents Igl1 and Igh1 of the two output transistors 3, 4 is incremented by 1. To finish with, a test is made as to whether the time interval tdelR2D equals the time interval TdelR2DOPT and, if so, the process skips to the block "switching response optimization", whereby "equal" in the present process means that the sensed delay is within a time interval tSW2DOPT defined as an optimum. When no overflow occurs in the two first comparisons the process backpedals to the start of the block for the following (corresponding) edge to wait for the next edge. When an overflow occurs, the process skips to the block "switching response optimization" for the following (corresponding) edge.

In the "switching response optimization" block the process waits likewise for the corresponding edge of the input signal IN, after which a time interval tSWR2D representing the switching response is sensed. This is followed in turn by a three-stage analysis in which, firstly, the value sensed in each case is compared to a time interval tSWR2DOPT representing the optimum and, depending on the result, the gate current Igl2 or Igh2 is adjusted for the transistor 4 and 3 respectively.

When the time interval tSWR2D is smaller than the count representing the time interval tSWR2DOPT the gate currents Igl2 and Igh2 of the two output transistors is decremented by 1. This is followed by a comparison of time intervals tSWR2D and tSWR2DOPT to see whether the sensed value tSWR2D is greater than tSWR2DOPT. If so, then the count representing the gate currents Igl2 and Igh2 of the two output transistors is incremented by 1. To finish with, a test is made to see whether the time interval tSWR2D equals the time interval tSWR2DOPT and, if so, optimization is terminated. When no overflow occurs in the two first comparisons the process returns to the start of the block for the following (corresponding) edge and waits for the next edge, otherwise when an overflow occurs, optimization is terminated.

Figure 8:
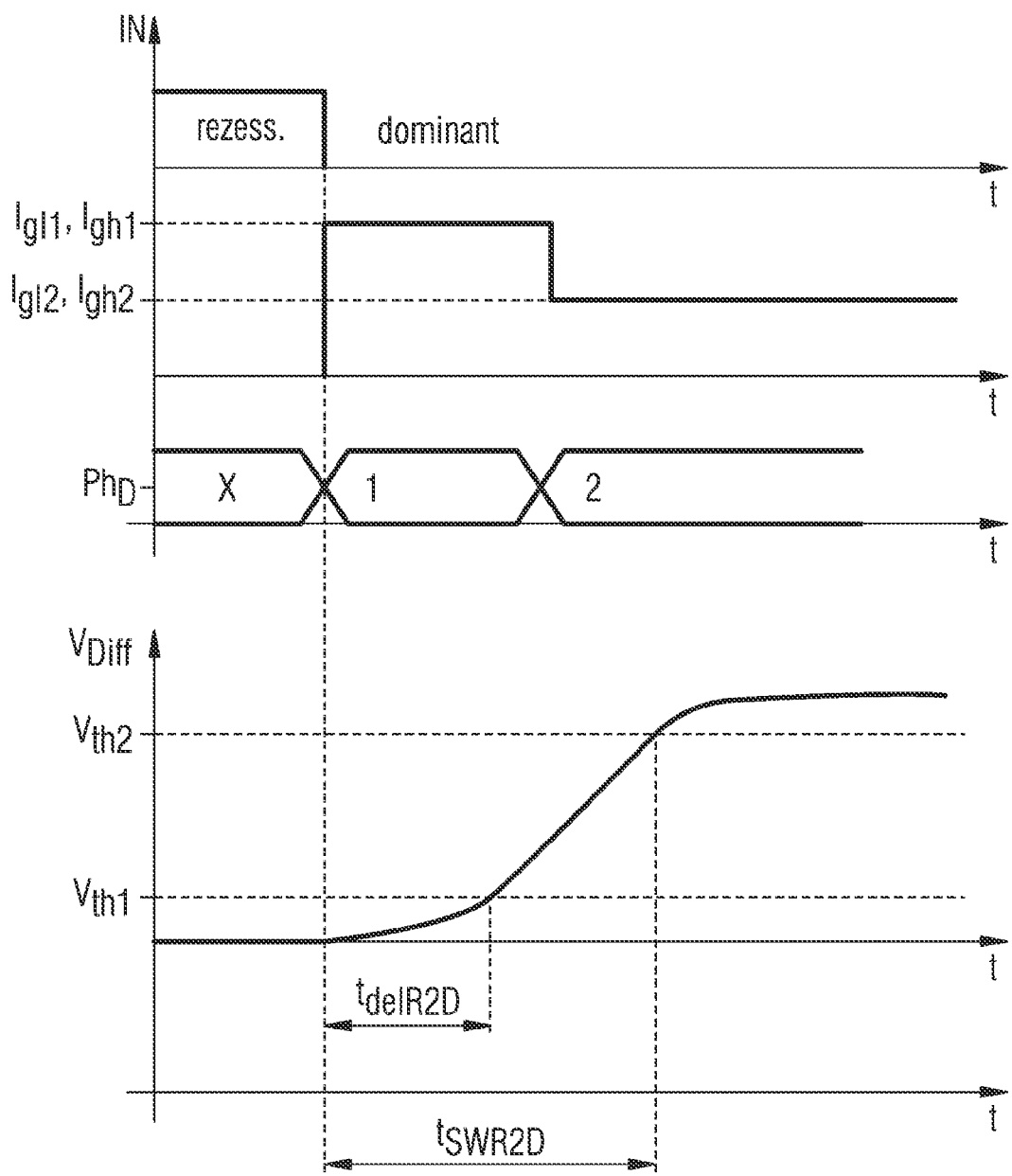
FIG. 8 is a plot showing the signal profiles in the optimizing method as shown in FIG. 7.

Referring now to FIG. 8 the plots corresponding again to the input signal IN are illustrated so that in turn a trailing or leading edge of the input signal IN triggers a train of time slots which, however, do not cover the total pulse duration of the input signal IN, standing for one specific resulting phase shift and termed discrete phase PhD in the following. When an edge occurs two discrete phases are presently generated. The delay and switching response of the two output signals CANH and CANL are derived from the difference of the two signals, termed VDiff in the following. Determining the delay is based on a value VDiff, namely Vth1, so that the range for values below Vth1 is to be considered as dead time or delay.

In terms of discrete phase values in the example as shown there is a delay by one time slot until the difference value VDiff exceeds the value Vth1, the time passing until this happens being tdelR2D representing the delay. Until the value Vth2 is attained this is followed by a further time interval (which is also practically a function of the edge slope) until there materializes, in all, from this time interval and the delay a time interval tSWR2D representing the switching response.

Timeout of the delay and switching response, i.e., on having attained the value Vth2, finishes the actual switching action. In the present example the delay falls in phase 1 and the switching response in phase 2. The gate current for one of the output transistors 3, 4 assumes, for example, during phase 1, the value Igl1 (respectively Igh1) to then assume a lower value Igl2 (respectively Igh2) in phase 2. An even better phase adaptation, in other words a higher phase resolution, can be achieved by providing a higher number of time slots. Adjusting is then done over several changes of state, here again a distinction being made between trailing edges (changes of state from recessive to dominant) and leading edges (changes of state from dominant to recessive) in analysis.

In addition to adjusting the symmetry and edge shape the present process also optimizes the point in time or time range of their optimization, since for a number of reasons errors may occur, falsifying adaptation. This is why the error signals for optimizing the edge shape are cached or analyzed, for example, only at the certain point in time as a function of a certain event occurring or not, such as, for instance, edges occurring on at least one of the output signals, interference signals, output signals occurring in inadmissible value ranges (over/undervoltage), any bus state occurring in which the edge shape of the signals on the two-wire conductor cannot be exclusively influenced by the bus driver, and signals activating the drivers occurring where optimization is not wanted.

Such interference, for example, in a CAN bus may be partial network operation, EMC interference, bus errors, the acknowledge bit at the end of a telegram or a collision in the arbitration phase. This is why the point in time of optimization is selected to permit optimized adaptation, as may be done by excluding some phases and identifying other phases as being particularly favorable in providing for optimizing the edges can be started, interrupted, discontinued and/or prevented under certain conditions. In addition to this, on completion of optimization it can be decided whether the configuration established as being an optimum is to be accepted or not. If accepted, at the next opportunity (time or change in temperature, etc., as defined) a reoptimization is started, resulting in a new configuration, otherwise the stale configuration is taken over. By contrast, a configuration may be dumped or an optimization not started when the maximum number of iteration steps is reached, an overflow has occurred or when the difference between the cached vector and the new vector is too great. Apart from this, optimization can be interrupted when an error has occurred therein, such as, for example, when a short-circuit occurs on the bus or the error signal departs from a defined range of values, and so on.

Figure 9:
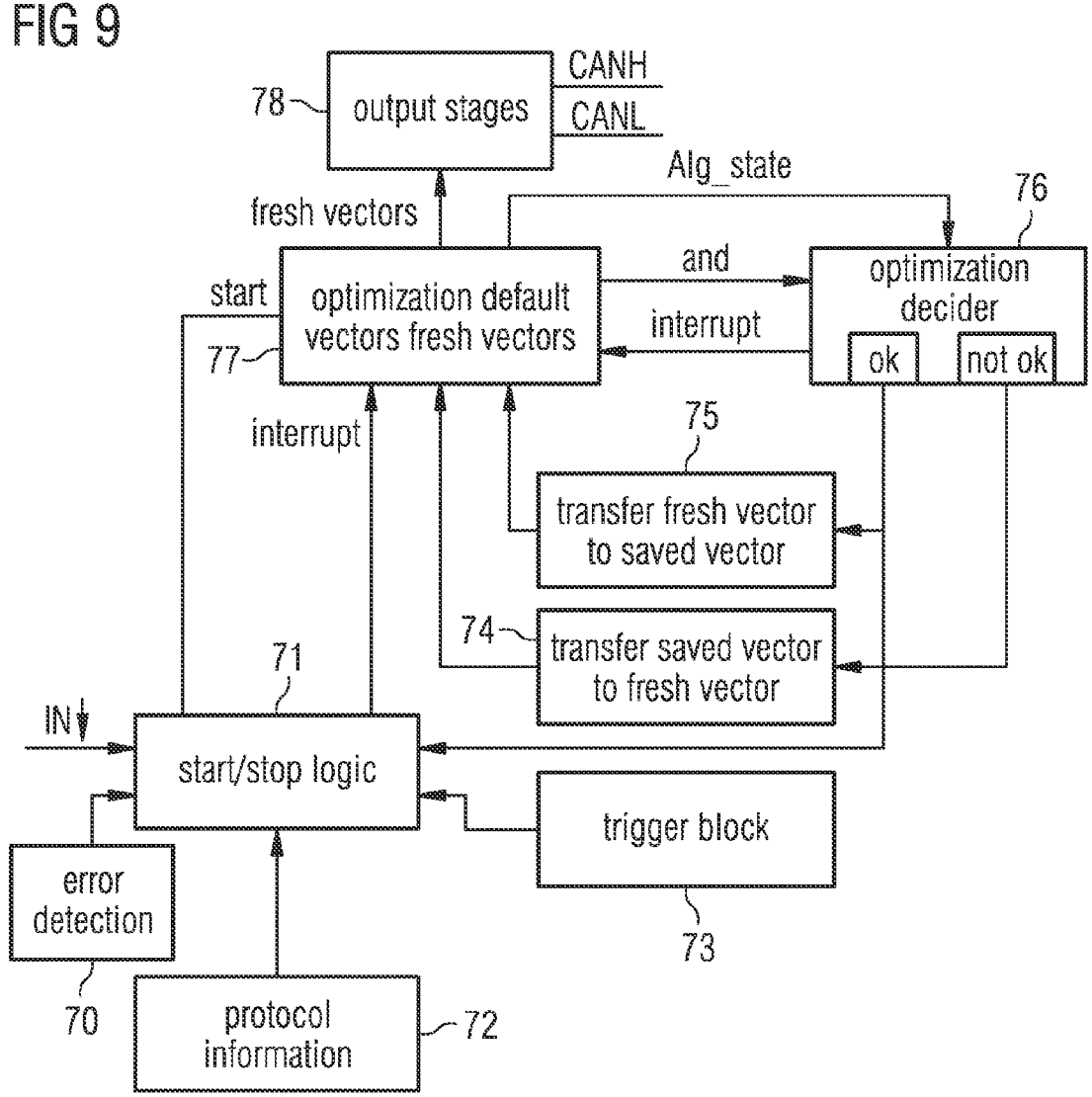
FIG. 9 is a signal flow diagram of a method for optimizing timing start and stop of optimizing symmetry and edge shape, and acceptance of the result.

Referring now to FIG. 9 there is illustrated a signal flow diagram showing how the point in time of optimizing the symmetry and edge shape is itself optimized as instigated by the processing block 71 when needed by receiving the data of the processing blocks 70, 72, 73 and 76. In this arrangement the processing block 73 furnishes a trigger signal (which can be activated for example, periodically or when the change in the chip temperature is excessive) whilst the other processing blocks 70, 72 and 76 furnish data resulting in optimization being started, stopped or interrupted or reset of the fresh vector (meaning that the result of an earlier optimization is taken over), for example, optimization being so falsified by external EMC irradiation that it would make no sense to take over the result of optimization, for example, among other things, processing block 70 may signal bus errors (short-circuit to GND, VS, VCC . . . ), in this case the common-mode signal is so falsified that optimization can be halted, interrupted or blocked (resulting in it not being started in such a condition).

In addition, processing block 72 may furnish data as to the protocol (or from even higher layers of the OSI layer model) from which a time window for occurrence of a signal for activating the driver can be derived in which an optimization is not wanted. For instance, at the end of a CAN protocol telegram an acknowledge bit may be sent or at the start of the telegram the arbitration phase has not been concluded, resulting perhaps in the bus voltages not being determined by a sole transceiver, in which case an optimization would lead to wrong results. In addition, the optimization plot itself can be monitored (processing block 76). If, for example, optimization fails to converge (indicated by the signal ALG_state of processing block 77) or if the result deviates excessively from the previous result or if the common-mode signal fails to remain within a permissible range during optimization (as would be the case with EMC, for instance) a decision can be made not to accept the results of the optimization or to interrupt optimizing.

From the data and signals as received, and conditions permitting, the processing block 71 starts a processing block 77 which optimizes the default vectors of the fresh vectors and forwards the thus updated vectors to a processing block 78 which results in the output stages being adjusted in accordance with the updated output signals CANH and CANL. Optimization can be interrupted by corresponding interrupt signals of processing blocks 71 and 76. Processing block 76 receives in its part from processing block 77 a signal which terminates its activity or a signal ALG_state which alters its basic decision algorithm. By way of the corresponding fresh algorithm a decision is made in the processing block 76 as to whether optimization is sufficient or not. If optimization is complete, processing block 75 is activated and, if not, processing block 74 is activated.

Although the present invention and its advantages have been described in detail, it should be understood that various changes, substitutions, and alterations can be made herein without departing from the spirit and scope of the invention as defined by the appended claims. For example, it will be readily understood by those skilled in the art that the voltages and polarities may be altered while remaining within the scope of the present invention.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A driver circuit for a two-wire conductor, the driver circuit comprising:
    a first output stage that generates at an output a first output current from a two-state logic input signal, the first output stage being adjustable as to a magnitude of the first output current;
    a second output stage that generates at an output a second output current from the input signal, the second output current being complementary to the first output current; and
    a controller coupled to the first and second output stages for analyzing output voltages appearing at the outputs of the first and second output stages, deriving an error signal from the output voltages within each of at least two time slots subsequent to a change in state of the input signal, caching the error signal or a signal derived therefrom and adjusting, as a function of the cached signal, the first output current of the first output stage in arbitrary time slots subsequent to a proximate change in state of the input signal.

2. The driver circuit as set forth in claim 1, wherein the error signal is a function of a difference between half the sum of the output voltages and a reference voltage.

3. The driver circuit as set forth in claim 1, wherein the error signal is a function of a difference between the output voltages.

4. The driver circuit as set forth in claim 1, wherein adjusting the first output current of the first output stage is done by the controller until symmetry is achieved over several changes of state of the input signal.

5. The driver circuit as set forth in claim 1, wherein a first change in state in the input signal from one state to another state and a second change in state from the other state to the one state occur and error signals on a first change in state up to the following first change in state and on a second change in state up to the following second change in state are cached and then analyzed.

6. The driver circuit as set forth in claim 1, wherein the second output amperage of the other output stage is adjustable by means of a corresponding control signal.

7. The driver circuit as set forth in claim 6, wherein, in response to a change in state of the input signal, output signals of the first and second output stages change by an edge profile, wherein and the edge profile is adjustable.

8. The driver circuit as set forth in claim 7, wherein the edge profile is adjusted so that a resulting signal delay remains within a predefined time window relative to the input signal.

9. The driver circuit as set forth in claim 1, wherein each output stage comprises a transistor with a load path and a gate, the load path of each transistor being coupled between a terminal of a supply voltage source and the signal output of the corresponding output stage, wherein the transistor is controlled at its gate such that a corresponding output current is impressed.

10. The driver circuit as set forth in claim 1, wherein the controller is configured so that it processes error signals at least partly time and/or amplitude discrete.

11. The driver circuit as set forth in claim 1, wherein error signals are cached or analyzed only in certain time slots that are determined as a function of an occurrence or non-occurrence of certain events.

12. The driver circuit as set forth in claim 11, wherein the events comprise an occurrence of edges of at least one output signal, an occurrence of interference and/or an occurrence of error signals in inadmissible value ranges.

13. A method for generating two complementary output currents from a two-state logic input signal at two outputs for connecting a two-wire conductor, the method comprising:
    generating an output signal at each output from the input signal, a magnitude of one of the output currents being adjustable by a control signal;
    analyzing each voltage materializing at the outputs;
    generating an error signal as a function of output voltages within each of at least two time slots subsequent to a change in state of the input signal;
    caching error signals or signals derived therefrom; and
    adjusting, as a function of cached signals, the output current in optional time slots subsequent to a resulting change in state of the input signal.

14. The method as set forth in claim 13, wherein the error signals are a function of a difference between half a sum of the output voltages and a reference voltage.

15. The method as set forth in claim 13, wherein the error signal is a function of a difference between the output voltages.

16. The method as set forth in claim 15, wherein the error signals are cached and/or analyzed only in certain time slots as a function of an occurrence or non-occurrence of at least one certain event.

17. The method as set forth in claim 16, wherein the at least one certain event comprises an occurrence of edges of at least one of the output signals, an occurrence of interfering signals and/or an occurrence of output signals in inadmissible value ranges.

18. The method as set forth in claim 16, wherein the certain event comprises an occurrence of such a state on a bus in which an edge shape of the signals on the two-wire conductor is not exclusively influenced by the output stage concerned.

19. The method as set forth in claim 16, wherein the certain event comprises an occurrence of an activation signal for the output stages in which an optimization is not wanted.

20. The method as set forth in claim 13, wherein adjusting the output currents of one output stage is done by a controller until symmetry is achieved over several changes of state of the input signal.

21. The method as set forth in claim 13, wherein a first change in state in the input signal from one state to another state and a second change in state from the other state to the one state occur and error signals on the first change in state up to a following first change in state and on the second change in state up to a following second change in state are cached and then analyzed.

22. The method as set forth in claim 13, wherein the magnitude of the output current of an other output stage is adjustable by means of a corresponding control signal.

23. The method as set forth in claim 22, wherein, in response to a change in state of the input signal, output signals change by a certain edge profile and the edge profile of the output signals is adjustable.

24. The method as set forth in claim 23, wherein the edge profile is adjusted so that a resulting signal delay remains below a predefined value as regards the input signal.

25. The method as set forth in claim 13, wherein a controller is configured so that it processes the error signals, at least partly, time and/or amplitude discrete.

* * * * *